Sept. 29, 1970        M. R. ESTABROOK        3,531,403
METHOD FOR DECONTAMINATING FLUID
Filed March 7, 1968        3 Sheets-Sheet 1
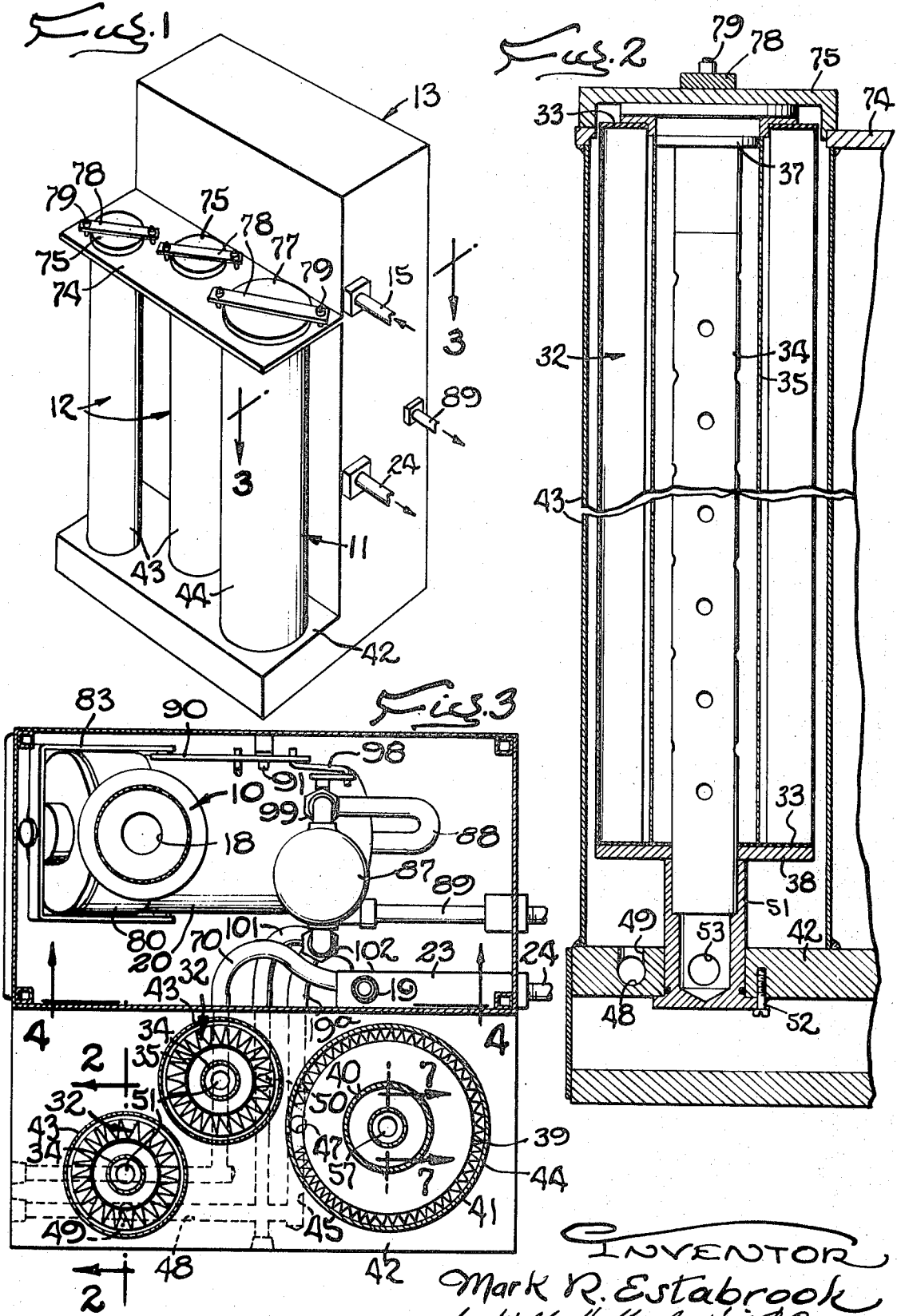
INVENTOR
Mark R. Estabrook
ATTORNEYS

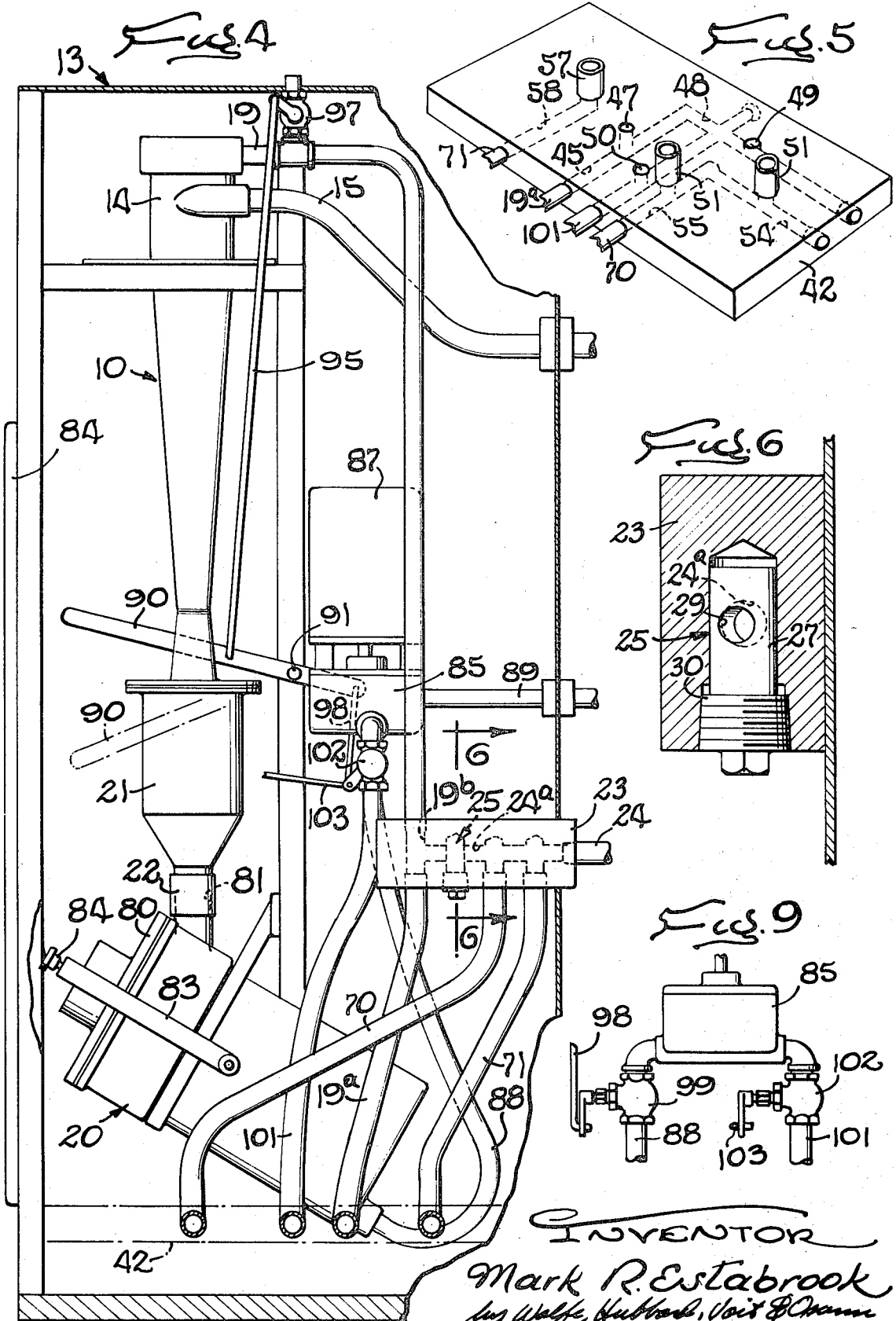

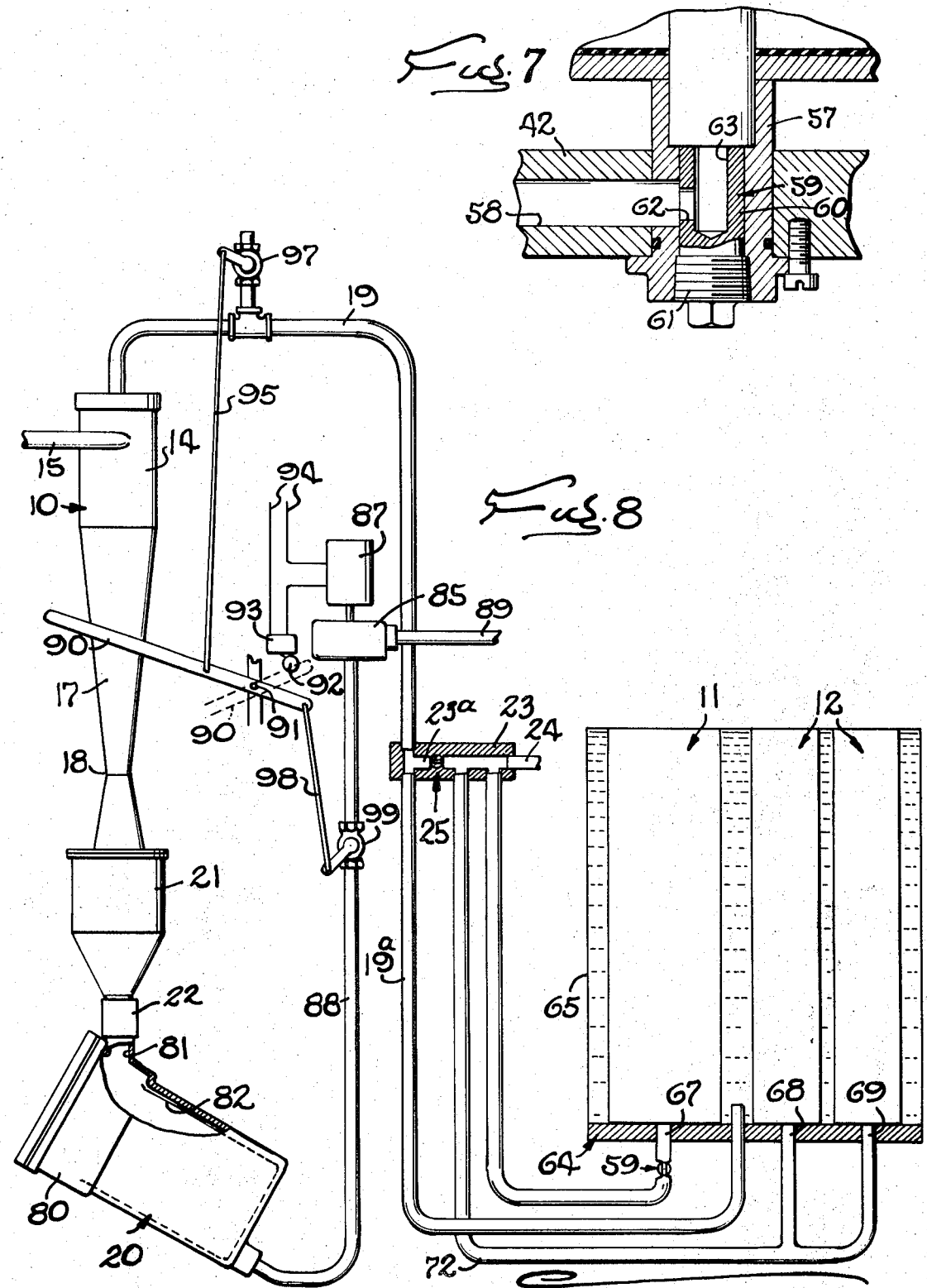

United States Patent Office 3,531,403
Patented Sept. 29, 1970

3,531,403
METHOD FOR DECONTAMINATING FLUID
Mark R. Estabrook, Rockford, Ill., assignor to Barnes Drill Co., Rockford, Ill., a corporation of Illinois
Filed Mar. 7, 1968, Ser. No. 711,276
Int. Cl. B01d 21/29
U.S. Cl. 210—39                                        3 Claims

ABSTRACT OF THE DISCLOSURE

A decontaminating method having a hydroclone separator into which fluid is injected and delivering precleaned fluid through one exit for final cleaning while solid contaminants are collected in an inclined underflow pot in a disposable bag. The precleaned fluid passes through a manifold block where part is routed to a final cleaning station having disposable charcoal and paper filter cartridge connected in parallel on a manifold base, the output from the cartridges being returned to the manifold block and mixed with the remainder of the precleaned flow. Adjustable flow controllers restrict the by-pass flow through the block and also the flow from the charcoal cartridge to determine the proportions of the respective flows, and a centrifugal pump is provided for exhausting the underflow pot when the bag is to be changed and the cartridge chamber or chambers when the cartridges are to be changed.

BACKGROUND OF THE INVENTION

This invention relates to the cleaning of fluid contaminated with both dissolved and solid substances and, more particularly, to the decontamination of dry-cleaning fluid in a closed dry-cleaning system, that is, a system in which a quantity of solvent is circulated continuously during a dry-cleaning operation through a batch of articles being cleaned, through an apparatus for removing contaminants picked up from the articles, and then back through the articles and the decontaminating apparatus. The cycle is repeated as many times as necessary for effective cleaning of the batch, and then is terminated for removal of the cleaned batch and insertion of another to be cleaned.

A recent improvement in such decontamination utilizes a hydroclone separator as a first stage cleaner for removing larger solids from the fluid and then passes part of the precleaned fluid through a final cleaning station having series-connected chemical bed and filter cleaners for removing dissolved contaminants and smaller solid contaminants passed by the hydroclone separator, the filter cleaner also removing any chemical particles that are sloughed by the chemical bed into the fluid. The remainder of the precleaned fluid is by-passed around the final cleaning station for direct recycling through the system, and is mixed with the final-cleaned fluid for such recycling.

SUMMARY OF THE INVENTION

The primary objective of the present invention is to improve the operation of systems of the foregoing character by eliminating clogging of the filter by chemicals sloughed by the chemical bed, thereby increasing the life of the filter in service use. Another object is to reduce the proportion of the fluid that is passed through each of the final cleaners while making it possible to increase the proportion of flow through the final cleaning station in order to subject a greater volume of fluid to final cleaning while reducing, to some extent, the total back pressure on the system produced by the final cleaners. A related object is to increase the versatility of the decontaminating apparatus with respect to the control of the various fluid flows, and also to provide a decontaminating apparatus in which a hydroclone separator and chemical and filter cartridges are arranged in a novel manner for compactness, simplicity and economy of construction.

Other objects and advantages will become apparent from the following detailed description, taken in conjunction with the accompanying drawings.

BRIEF DESSCRIPTION OF THE DRAWINGS

FIG. 1 is a perspective view of a decontaminating apparatus embodying the novel features of the present invention.

FIG. 2 is an enlarged fragmentary cross-sectional view taken in a vertical plane through one of the filter elements, the view being taken substantially along the line 2—2 of FIG. 3 in the direction of the arrows therein.

FIG. 3 is an enlarged cross-sectional view taken substantially along the line 3—3 of FIG. 1.

FIG. 4 is an enlarged fragmentary cross-section taken substantially along the line 4—4 of FIG. 3 and partly broken away for clarity of illustration.

FIG. 5 is a fragmentary perspective view showing the manifold base for supporting and feeding the final cleaning elements.

FIG. 6 is an enlarged fragmentary cross-sectional view taken substantially along the line 6—6 of FIG. 4 and showing one position of an adjustable flow controller for varying the by-pass flow from the hydroclone separator around the final cleaning elements.

FIG. 7 is an enlarged fragmentary cross-sectional view taken substantially along the line 7—7 of FIG. 3 and showing the outlet of the chemical bed cleaner and a flow controller therein.

FIG. 8 is a schematic side elevational view of the basic parts of the decontaminating apparatus, the final cleaning elements being shown in a modified, but hydraulically equivalent, form and parts being broken away and shown in cross-section.

FIG. 9 is a fragmentary elevational view of a pump and its valving for alternately exhausting the final cleaning station and the collection receptacle of the hydroclone.

DETAILED DESCRIPTION

As shown in the drawings for purposes of illustration, the invention is embodied in a decontaminating apparatus for removing dissolved and solid contaminants from dry-cleaning fluid circulated in a closed system from a conventional dry-cleaner (not shown) through a hydroclone separator 10 for removal of larger solid particles, according to the capabilities of the hydroclone, then to a final cleaning station where part of the fluid passes through chemical bed and filter cleaners 11 and 12, respectively, for removal of dissolved contaminants and smaller solid particles, and finally back through the dry-cleaner for another pass through the batch of articles being cleaned and recirculation back through the decontaminating apparatus. The hydroclone 10 removes most of the lint, dirt and other solid particles to preclean the fluid before the latter passes to the final cleaning elements, and the chemical bed cleaner removes free dyes as well as other dissolved contamination, including perspiration and other oily substances. The filter cleaner, in turn, removes smaller particles that have passed through the hydroclone, thus completing the cleaning of the fluid with a high degree of effectiveness before it is returned to the dry-cleaner for another pass through the garments therein.

The hydroclone 10 (FIGS. 4 and 8) is mounted in a cabinet 13 (FIGS. 1, 3 and 4) and is of basically conventional construction including a cylindrical upper inlet section 14 into which an inlet line 15 opens tangentially from a pump (not shown) drawing fluid from the drycleaner and injecting the fluid into the inlet section. Below this is a conical section 17 in which the fluid spirals downwardly to separate heavier substances by progressively increasing centrifugal force, the heavier substances leaving through a lower exit at 18 while the lighter fluid moves upwardly in a forced flow through the center of the cone and out through a vortex finder (not shown) and a line 19 forming an exit for the precleaned fluid. The solids are collected in a pot 20 communicating with the exit 18 through an underflow section 21 and a conduit 22, which preferably is transparent to permit observation of the fluid therein.

After leaving the hydroclone 10 through the line 19, the precleaned fluid is carried to a flow divider 23 where part of the fluid is routed through an extension line 19a to the final cleaning station and the remainder is by-passed around the final cleaning station to a line 24 for direct return to the drycleaner. Herein, the flow divider is a manifold block having a transverse conduit or passage 19b connecting the lines 19 and 19a and a longitudinal conduit or passage 24a leading from the passage 19b to the return line 24. A flow controller 25 (FIGS. 4 and 6) provides an adjustable restriction for admitting a selectively variable flow of fluid from the passage 19b into the passage 24a, thus dividing the precleaned flow to by-pass a selected amount of the flow around the final cleaning station while the remainder is passed through the station.

Herein, the flow controller 25 comprises a pin 27 (FIG. 6) snugly fitted in a transverse bore 28 in the block 23 perpendicular to the passage 24a, the pin having a cross-bore 29 through which fluid can flow through the pin and thus through the passage 24a from the line 19 to the line 24. The pin is fast on a plug 30 threaded into the block and thus turns with the plug and is held in an angular relationship in the passage determined by the angular position of the plug. By turning the plug with a suitable tool such as a wrench engageable with a head 31 on the exposed outer end, the effective flow area of the restriction can be increased and decreased to change the by-pass flow rate produced by a given pressure in the system.

As shown most clearly in FIGS. 2 and 3, the filter cleaner 12 herein comprises two filter elements each having an easily changeable cartridge, indicated generally at 32, in the form of corrugated tubes of filter paper having gasket rings 33 around the upper and lower ends. Each cartridge is disposed around a core comprising a perforated metal tube 34 and a coaxial perforated case 35 joined together by top and bottom rings 37 and 38, the bottom ring forming a base upon which the filter cartridge rests. Such cartridges are commercially available items which may be purchased with papers of varying fineness, one-half micron paper being preferred. The number of cartridges may be varied according to the capacity of the system, two being used for flow rates on the order of thirty gallons per minute.

The chemical bed cleaner 11 also is in cartridge form and comprises an outer permeable casing 39 herein composed of coarser corrugated paper, and perforated metal inner and outer cylinders 40 and 41 forming a can which confines the chemical bed in the cartridge. Activated charcoal and other adsorptive substances constitute the chemical bed, which hereafter will be referred to as the charcoal cleaner. It should be noted that one or more banks of final cleaning elements may be added for increased flow capacities, as may additional hydroclone precleaners.

Heretofore, the fluid passed through the charcoal cartridge 11 has been passed through the filters as well to prevent any charcoal or other chemicals sloughed or escaping from the charcoal cleaner from circulating through the system, such chemicals being caught by the filters. I have discovered that this not only is unnecessary but also has certain disadvantages, the elimination of which materially enhances the performance of the system in service use. By dividing the flow to the final cleaning station into two subflows and passing one flow only through the charcoal cleaner and the other flow only through the filters, clogging of the filters by sloughed chemicals is eliminated, thereby increasing the life of these elements in service use, and the back pressure created by the final cleaning station and acting against the hydroclone 10 is reduced to some extent. Moreover, the apparatus has greater versatility because the flow through the charcoal cleaner is not routed through the filters, thus making the apparatus more flexible with respect to selection of the relative rates of flow as well as more practical from the standpoint of flow routing. Finally, the total flow through the final station may be proportionally greater because it is divided between the two types of cleaners rather than passed in series through the cleaners.

In this instance, the filters and the charcoal cleaner are supported on a common base 42 that is formed in the preferred embodiment (FIGS. 1–7), as a manifold to which the fluid to be final cleaned is delivered, and this fluid is distributed through the base to the respective cleaners which are individually enclosed in liquid-tight cases 43 and 44 upstanding from the base. As shown in FIGS. 4 and 5, the extension conduit 19a opens into one edge of the base and into a passage 45 for delivering fluid to the charcoal cleaner case 44 through a port 47 opening into the case outside the charcoal, and also having a right-angled portion 48 communicating with ports 49 and 50 opening into the two filter cartridge cases 43 outside the filter papers 32. The core tubes 34 of the filters are pressed at their lower ends into flanged outlet sleeves 51 (see FIGS. 2 and 5) which extend through the base 42 and are bolted thereto at 52 with holes 53 in the sleeves opening laterally into communicating right-angle passages 54 and 55 in the base. Thus, these passages receive the filtered flows from the two filter cartridges and combine the flows for return to the dry-cleaning system.

Similarly, the flow delivered to the case 44 of the charcoal cleaner through the port 47 flows through the charcoal cleaner to an outlet sleeve 57 upstanding from the base 42 inside the inner perforated wall 40 of the cartridge. This sleeve communicates with a conduit 58 in the base through which the flow from the charcoal cleaner is returned to the system.

As shown in FIG. 7, a second flow controller 59 is incorporated in the outlet sleeve 57 of the charcoal cleaner to restrict the flow out of the cleaner and thus control the rates of flow through all of the cleaners. This controller comprises a pin 60 fast on a plug 61 which is threaded into the outer or lower end of the sleeve for rotation between different selected angular positions with a transverse outlet passage 62 formed in the pin, herein perpendicular to the axis of rotation, in communication at one end with a longitudinal inlet passage 63 in the pin opening through the upper end of the pin and at the other end with the passage 58 in the base. With this arrangement, rotation of the plug 61 and the pin 60 to different angular positions changes the effective flow area of the outlet passage 62 to vary the flow through the charcoal cleaner that will be produced by a given input pressure. Of course, a reduction in this flow results in a corresponding increase in flow through the filter cartridges, and an increase in this flow causes a reduction in the flows through the filters. When the controller 59 is left in a selected angular position and the controller 25 is adjusted to change the flow to the final cleaning station, both the charcoal flow and the filter flows are changed proportionally.

A slightly modified arrangement is illustrated schematically in FIG. 8 wherein the filter and charcoal cleaners 11 and 12 are shown as mounted on a common manifold base 64, as before, but are enclosed in a common casing 65 defining one chamber to which the fluid is delivered by the conduit 19a to be forced through the respective cartridges. Accordingly, the base is formed with a single inlet passage and three outlet passages 67, 68 and 69 receiving fluid from the cartridges. In all other respects, the two forms are identical, and it will be recognized that they are hydraulically the same in principle. The separate cases of the preferred embodiment do, however, provide for positive confinement of fluid around each individual cartridge and limit the total space that needs to be filled to bring the fluid level up to near the upper ends of the cartridges. As before, the flow controller 25 is in the manifold block 23 and the controller 59 is incorporated in the outlet of the charcoal cleaner 11.

It will be seen that the outlet passages 55 and 58 (FIGS. 3 and 5) in the base 42 open through the edge of the base and connect with pipes 70 and 71 which lead back to the manifold block 23 and connect with passages opening into the longitudinal passage 24a beyond the flow controller 25. Accordingly, the final cleaned flows are mixed with the by-passed flow in the manifold block and delivered to the line 24 for return to the drycleaner. The equivalent arrangement in FIG. 8 operates similarly, the filter return lines 68 and 69 merging into a common line 72 which leads to the manifold block, as does the charcoal line 67.

As shown in FIGS. 1 and 2, a single top plate 74 preferably is provided for the three cartridge cases 43 and 44 and is formed with circular openings over the cases. A removable cap 75, 77 covers and seals each opening and is releasably held in place by a clamp 78 secured to studs 79 on opposite sides of the opening. Thus, removal and replacement of cartridges may be accomplished simply by removing the caps, withdrawing the used cartridges and inserting the fresh cartridges before resealing the cases with the caps. The chamber 65 shown in FIG. 8 may have an identical top plate and access covers.

With the foregoing arrangement, the precleaned fluid leaving the hydroclone 10 through the conduit 19 is separated at the manifold block 23 into two flows, one continuing through the extension 19a to the final cleaning station and the other by-passing the station through the passage 23a, the controller 25, and the line 24. With a given output pressure from the hydroclone, the setting of the controller may be varied to change the proportion of the flow that is by-passed and, thus, the proportion that is routed through the final cleaning station. Assuming a total flow output on the order of twenty-eight gallons per minute, one satisfactory division is thirteen gallons per minute through the by-pass and the remainder of the fifteen gallons per minute to the final cleaning station.

The remainder is delivered to the manifold base 42 (FIG. 5) or 64 (FIG. 8) and thence to the cartridges, either through the conduits 45, 48 (FIG. 5) or through the common chamber shown in FIG. 8, and is forced in parallel flows through the three cartridges and then back into the base. The relative proportions flowing through the respective cartridges is determined by the setting of the controller 59 restricting the output flow through the charcoal cleaner. For example, the controller may be set to pass five gallons per minute with the given output pressure in which case ten gallons per minute would be forced through the filters, five through each. The three final-cleaned flows then pass through the return lines back to the manifold block 23 and are combined with the by-pass flow in the passage 23a leading to the return line 24. After the fluid passes again through the drycleaner, it is pumped back into the hydroclone 10 for recirculation through the decontaminating apparatus.

While the above flow rates are given for purposes of illustration only, it should be stated that they have been found to be quite satisfactory and that the illustrative proportions are believed to produce optimum results. Of course, a primary objective is to increase the by-pass flow and to correspondingly reduce the final-cleaned flows to the greatest possible extent commensurate with sound dry-cleaning practice.

As previously stated, the solid particles separated from the contaminated fluid by the hydroclone 10 are collected in the pot 20 which herein comprises a cylindrical container open at one end and a cap 80 for the container having an inlet 81 through which the particles enter the pot, with a bag 82 (see FIG. 8) composed of permeable filter material fitted into the container to receive particles through the inlet. A U-shaped clamp 83 is pivoted on the container, in the manner of a bucket handle, and carries a screw 84 adapted to be tightened against the end of the cap to clamp the latter firmly over the end of the container.

For convenience in removing a bag 82 from the pot 20, and for overall compactness of structure, the pot is mounted under the hydroclone 10 in an inclined position with the open end facing upwardly and toward the side of the cabinet 13 on which an access door 84 (FIG. 4) preferably is mounted. This shortens the total length of the hydroclone structure and positions the pot for quick and easy removal of the cap 80 and the bag when the latter has become filled to an extent indicating a need for emptying or replacement. The inlet 81 is a passage extending downwardly through the cap and opening vertically into the inclined pot above the open end of the bag to deposit solids directly onto a portion of the sidewall of the bag.

During operation of the hydroclone, the pot 20 is filled with fluid through the underflow section 21 and the transparent conduit 22, and separated solids settle through this fluid into the bag 82. It has been found that, in normal dry-cleaning operation, the accumulation of solid particles in a bag usually may be allowed to build up progressively over an extended period of time, as long as one or two weeks, before a change of bags is required. To accomplish the change, the circulating pump of the system is stopped, the fluid in the pot is drained or pumped out (preferably being removed by a pump capable of drying the accumulated solids at least partially after the bulk of the fluid has been drawn out), the cap 80 is removed, and the bag 82 is lifted out of the container and replaced with a fresh bag. Then the cap is fitted back on container and clamped in place before operation is resumed.

Herein, a centrifugal pump 85 (FIGS. 3, 4, 8 and 9) driven by an electric motor 87 is used to draw the fluid from the pot 20 through a drain line 88 opening into the lowermost portion of the container, the output of the pump being delivered to a line 89 for returning exhausted fluid to the system, for example, to a reservoir (not shown) receiving contaminated fluid from the drycleaner. A hand lever 90 is pivoted at 91 on the frame of the cabinet 13 with an inner end portion positioned for engagement with an operator 92 (FIG. 8) for closing a switch 93 when the opposite or outer end portion of the lever is pushed downwardly to the "start" position shown in broken lines in FIGS. 4 and 8, thus completing an energizing circuit through the motor windings across two power lines indicated schematically at 94 in FIG. 8. At the same time, a link 95 connected to the outer end portion of the lever actuates a valve 97 to vent the hydroclone 10 and permit fluid to be drawn downwardly therefrom, and a second link 98 connected to the inner end of the lever actuates a valve 99 to open the pump intake line 88 leading to the pot 20. Thus, the pot and the hydroclone are emptied of fluid preparatory to removal of the bag 82. Operation may be resumed after the bag is changed simply by shifting the lever 90 back to the normal position, shown in full lines in FIGS. 4 and 8, and restarting the circulating pump of the system, the valves 97 and 99 and being closed as the pump is shut off.

Periodically, the chemical bed cleaner 11 becomes substantially exhausted and the filters 12 become caked and clogged with filtered-out solids to an extent requiring replacement for continued effective operation. When this occurs, the fluid remaining in the final cleaning station should be exhausted prior to removal of the cartridges, the pump 85 preferably being used for this purpose. Herein, the pump has an alternate intake line 101 (FIGS. 4, 5 and 9) communicating through the manifold base 42 with all three cartridge cases to pump fluid out of the cases when the pot-exhaust valve 99 is closed and a valve 102 is opened, this being accomplished by a manually movable link 103 accessible from outside the cabinet. This link opens valve 102 and energizes the exhaust pump to exhaust all of the fluid through line 89. In this way, a single pump is sufficient for both pumping operations. This arrangement has not been incorporated in FIG. 8, but it will be evident that the common case 65 can be emptied in the same way.

From the foregoing, it will be seen that the present invention constitutes an improvement in the method for decontaminating fluid with a hydroclone separator, a chemical bed cleaner, and one or more paper filters, avoids clogging of the paper filters by chemicals from the bed because these chemicals by-pass the paper filter for removal, instead, by the hydroclone during the next cycle of the fluid. Preferably, the initial operation of the system with a fresh charcoal cartridge is without clothing in the drycleaner so that the loose chemicals can be removed without exposure to any clothing.

In addition, the parallel connection of the various cleaner elements results in greater flexibility with respect to the various flows, and reduces the resistance in the final cleaning station because the flow is divided into at least two, and herein three parallel subflows for reduced back pressure and, therefore, greater capacity. The two flow dividers make variations in the different flows possible with a minimum of time and effort, although it will be apparent that both divisions may be fixed at optimum conditions for a given installation. These features, plus the simplified structural arrangement, constitute material improvements in the method for making the basic system a commercially practical arrangement.

I claim as my invention:

1. In a method of decontaminating a flow of dry-cleaning fluid contaminated with both dissolved and solid contaminants in a closed dry-cleaning system and including the steps of, injecting said fluid into a hydroclone separator having a first exit for solid contaminants removed by a cyclonic action and a second exit for a flow of precleaned fluid, passing a selected portion of said flow of precleaned fluid to a final cleaning station having chemical bed and filter cleaners and by-passing the remainder of said precleaned flow around said final cleaning station for direct recycling through said system, the improvement comprising the additional steps of, dividing said portion of said precleaned flow into first and second separated subflows each constituting a preselected proportion of said portion and passing the same respectively through said chemical bed cleaner and said filter cleaner, and returning said subflows to said system and thence to said hydroclone separator from the respective cleaners thereby to distribute said portion between said cleaners to minimize flow resistance in said final cleaning station while avoiding plugging of said filter cleaner by solid chemical particles sloughed by said chemical bed.

2. The method defined in claim 1 in which said portion is divided by delivering it to both of said cleaners through a common input system, and variably restricting the output of one of said cleaners thereby to permit variable selection of the proportion of the flows through the cleaners.

3. In a method of decontaminating a flow of dry-cleaning fluid contaminated with both dissolved and solid contaminants in a closed dry-cleaning system and including the steps of injecting said fluid into a hydroclone separator having a first exit for solid contaminants removed by cyclonic action and a second exit for a flow of precleaned fluid, passing a selected portion of said flow of precleaned fluid to a final cleaning station including a charcoal cartridge and a filter cartridge and by-passing the remainder of said precleaned flow around said final cleaning station for direct recycling through said system, the improvement comprising the additional steps of, forcing a predetermined part of said selected portion through said charcoal cartridge, forcing the remainder of said selected portion through said filter cartridge whereby each part of said portion passes through only one of said cartridges, and recycling the fluid from each of said cartridges through said system for removal by said hydroclone separator of charcoal particles sloughed by said charcoal cartridge.

References Cited

UNITED STATES PATENTS

| | | |
|---|---|---|
| 940,076 | 11/1909 | Seaver. |
| 1,170,438 | 2/1916 | Fahaney _____ 55—337 |
| 2,010,435 | 8/1935 | Matheson _____ 210—73 |
| 3,249,230 | 5/1966 | Clement _____ 210—261 |
| 3,291,562 | 12/1966 | Anderson _____ 210—254 X |

JOHN W. ADEE, Primary Examiner

U.S. Cl. X.R.

210—73, 84, 195, 196